(12) United States Patent
Krevet et al.

(10) Patent No.: US 10,835,987 B2
(45) Date of Patent: Nov. 17, 2020

(54) METHOD AND APPARATUS FOR CONNECTING COMPONENTS MADE OF DIFFERENT MATERIALS

(71) Applicant: VOLKSWAGEN AKTIENGESELLSCHAFT, Wolfsburg (DE)

(72) Inventors: Andreas Krevet, Moehnesee (DE); Christian Schuebeler, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 47 days.

(21) Appl. No.: 15/827,109

(22) Filed: Nov. 30, 2017

(65) Prior Publication Data

US 2018/0147652 A1 May 31, 2018

(30) Foreign Application Priority Data

Nov. 30, 2016 (DE) .......................... 10 2016 223 875

(51) Int. Cl.
*B23K 9/23* (2006.01)
*B23K 9/16* (2006.01)
(Continued)

(52) U.S. Cl.
CPC ............ *B23K 11/20* (2013.01); *B21D 39/031* (2013.01); *B23K 9/167* (2013.01); *B23K 9/232* (2013.01);
(Continued)

(58) Field of Classification Search
CPC ........ B23K 9/232; B23K 9/235; B23K 9/167; B23K 10/02; B23K 11/115; B23K 11/20;
(Continued)

(56) References Cited

U.S. PATENT DOCUMENTS 4,642,446 A * 2/1987 Pennington .......... B23K 35/004
219/121.64
6,215,094 B1 * 4/2001 Dausinger ............ B23K 26/032
219/121.62

(Continued)

FOREIGN PATENT DOCUMENTS

CN 102189357 A 9/2011
CN 103261005 A 8/2013
(Continued)

*Primary Examiner* — Bayan Salone
(74) *Attorney, Agent, or Firm* — Laurence A. Greenberg; Werner H. Stemer; Ralph E. Locher

(57) ABSTRACT

A method connects at least two components made of different materials by thermal joining. The two components include a first component made of a material that is suitable for thermal joining and a second component made of a material that cannot be processed using the thermal joining method of the first component. The method includes introducing an auxiliary joining part into the second component forming a form-locking connection and/or a force locking connection. The auxiliary joining part of is made of a material that can be thermally joined to the first component. The first component is thermally joined to the auxiliary joining part in the second component so as to produce a connection between the first component and the second component. The thermal joining is carried out by a beam welding method.

9 Claims, 1 Drawing Sheet

(51) Int. Cl.
  *B23K 11/20* (2006.01)
  *B23K 10/02* (2006.01)
  *B23K 26/21* (2014.01)
  *B23K 26/32* (2014.01)
  *B23K 11/11* (2006.01)
  *B23K 13/01* (2006.01)
  *B23K 28/02* (2014.01)
  *F16B 5/04* (2006.01)
  *F16B 11/00* (2006.01)
  *B21D 39/03* (2006.01)
  *B23K 26/211* (2014.01)
  *B23K 9/167* (2006.01)
  *B23K 26/323* (2014.01)
  *B23K 9/235* (2006.01)
  *B23K 101/00* (2006.01)
  *B23K 101/18* (2006.01)
  *B23K 103/04* (2006.01)
  *B23K 103/20* (2006.01)

(52) U.S. Cl.
  CPC .............. *B23K 9/235* (2013.01); *B23K 10/02* (2013.01); *B23K 11/115* (2013.01); *B23K 13/01* (2013.01); *B23K 26/211* (2015.10); *B23K 26/323* (2015.10); *B23K 28/02* (2013.01); *F16B 5/04* (2013.01); *B23K 2101/006* (2018.08); *B23K 2101/18* (2018.08); *B23K 2103/04* (2018.08); *B23K 2103/20* (2018.08); *F16B 11/006* (2013.01)

(58) Field of Classification Search
  CPC .... B23K 13/01; B23K 26/211; B23K 26/323; B23K 28/02; B23K 2101/006; B23K 2101/18; B23K 2103/04; B23K 2103/20; B21D 39/031; F16B 5/04; F16B 11/006
  See application file for complete search history.

(56) References Cited

U.S. PATENT DOCUMENTS

| | | | |
|---|---|---|---|
| 9,296,923 B2 | 3/2016 | Herzinger et al. | |
| 9,744,616 B2* | 8/2017 | Schneider | B23K 11/115 |
| 10,232,461 B2 | 3/2019 | Riether | |
| 2009/0269165 A1* | 10/2009 | Fujii | F16B 5/04 |
| | | | 411/503 |
| 2011/0097142 A1 | 4/2011 | Bassler et al. | |
| 2011/0219719 A1 | 9/2011 | Stol et al. | |
| 2012/0061357 A1* | 3/2012 | Ramsayer | B23K 26/04 |
| | | | 219/121.64 |
| 2013/0270229 A1* | 10/2013 | Pedersen | F16B 5/04 |
| | | | 219/106 |
| 2014/0283362 A1* | 9/2014 | Straub | B21D 39/031 |
| | | | 29/524.1 |
| 2014/0360991 A1* | 12/2014 | Steiner | B29C 65/1635 |
| | | | 219/121.63 |
| 2016/0158873 A1* | 6/2016 | Amedick | B23K 11/004 |
| | | | 219/86.1 |
| 2017/0001235 A1 | 1/2017 | Hartwig-Biglau et al. | |

FOREIGN PATENT DOCUMENTS

| | | | |
|---|---|---|---|
| CN | 105492155 A | 4/2016 | |
| CN | 105689873 A | 6/2016 | |
| CN | 105935858 A | 9/2016 | |
| DE | 102006012821 A1 | 9/2007 | |
| DE | 102010053608 A1 | 6/2012 | |
| DE | 102012017289 A1 | 5/2014 | |
| DE | 102013216820 A1 | 2/2015 | |
| DE | 102013218761 A1 | 3/2015 | |
| DE | 102014115370 A1 | 4/2015 | |
| WO | WO-2015024698 A1 * | 2/2015 | .......... B23K 11/004 |
| WO | 2015078794 A2 | 6/2015 | |

\* cited by examiner

METHOD AND APPARATUS FOR CONNECTING COMPONENTS MADE OF DIFFERENT MATERIALS

CROSS-REFERENCE TO RELATED APPLICATION

This application claims the benefit, under 35 U.S.C. § 119, of German patent application DE 10 2016 223 875.2, filed Nov. 30, 2016; the prior application is herewith incorporated by reference in its entirety.

BACKGROUND OF THE INVENTION

Field of the Invention

The invention relates to a method for connecting at least two components made of different materials by thermal joining, preferably by a welding method, and to a corresponding apparatus for carrying out the method according to the invention.

Current and future requirements in automotive engineering with respect to limits on fuel consumption and emissions, and the simultaneous demand for crash-optimized materials for high vehicle safety have led to increased use of lightweight structures and mixed construction methods that are implemented, inter alia, using combinations of steel materials with light metal materials, in particular aluminum. Since in this context thermal joining of the materials steel and aluminum to one another is problematic, it is known from the prior art to provide auxiliary joining parts for welding which are made of a weldable steel material and which are introduced into the poorly weldable component forming a form fit. The light metal components can then be thermally joined, in particular welded, to the steel components at said auxiliary joining parts.

Such a method is known for example from published, non-prosecuted German patent application DE 10 2013 216 820 A1 (corresponding to U.S. patent publication No. 2016/0158873), in which in order to connect two components a stamped element is first attached to the first component, and then the stamped element attached to the first component is welded to the second component. In that context, in the known method, welding is carried out using resistance spot welding in which two welding electrodes are brought into contact with the components. However, this welding method has the drawback that shunt effects can arise via already joined welding points, with the technical problems associated therewith. Furthermore, the suitability for spot welding is limited by certain plate thickness combinations. In addition, in the context of the known welding method, there is the risk for this specific application that the heating can cause the element to subside, which would result in unwanted recesses.

SUMMARY OF THE INVENTION

The invention is therefore based on the object of providing a method, which is both simple and reliable, for connecting components that cannot be directly thermally joined to one another.

In that context, at least two components—of which at least one component cannot be directly thermally joined, preferably welded, to the other component—are connected by first introducing, into the non-weldable component, an auxiliary joining part made of a weldable material. In another, second method step, which is preferably independent from the first method step, the components are then thermally connected to one another at the auxiliary joining part. This connection is then carried out, in a manner according to the invention, using a beam welding method, preferably a laser beam method, a plasma beam method or a TIG welding method.

In that context, the inventive use of a beam welding method has the advantage, over the electrical resistance welding methods that are only known from the prior art for this application, of producing a materially bonded connection between the auxiliary joining part and the steel plate. This makes it possible to reliably avoid the risk and drawbacks of a shunt effect, as in the case of resistance welding via the already joined welding points. Furthermore, it is also possible to weld multiple steel sheet layers to the auxiliary joining part, or to join multiple materials directly by the auxiliary joining part (clinch riveting) in order to then weld these to one or more steel sheet components. By means of corresponding deformations of the element protrusion, it is also possible to improve weldability. In that context, it is particularly advantageous to make the welding beam incident from the steel sheet side and thus weld as far as into the auxiliary joining part but without the welding beam passing fully through the auxiliary joining part.

Combining the inventive joining method with adhesive bonding of the components to one another is also possible and advantageous, for example in order to first secure the components until the adhesive connection has fully cured. This is particularly advantageous, inter alia, in the case of bodywork bonding using heat-curing adhesives in a CEC continuous oven. In order to further improve the weldability in that context, it is possible to remove the deposited adhesive in the region of the intended weld connection.

Of particular advantage in that regard is the use of laser beam or plasma beam welding methods, which also permit very good control over the weld depth. Weld depth control of this kind also has the advantage of being able to react individually to current requirements, and thus of being able to ensure high flexibility and quality.

Furthermore, the use of a beam welding method has the advantage that it is no longer necessary to take into account the spot welding suitability of certain sheet thickness combinations.

The targeted energy introduction of beam welding makes it possible to avoid the auxiliary joining part subsiding during welding, and thus to avoid or at least reduce the formation of a recess between the joining points.

Also achieved, advantageously, is the creation of a connection between all of the sheet layers through which the beam passes, in addition to the component into which the auxiliary joining part has been stamped.

A further advantage is achieved if the auxiliary joining part is made of a material similar or identical to that of the weldable component, since these can then easily be welded together.

In order, in this context, to achieve production that is as simple and cost-effective as possible, the method steps of introducing the auxiliary joining part and welding the components can take place in a single tool clamping period.

In order to achieve a good mechanical hold of the auxiliary joining part in the component, the former is introduced into the latter so as to form an overhang, it being preferable that plastic deformation of the auxiliary joining part also takes place.

The apparatus for carrying out the method has, for the introduction of the auxiliary joining part, a press or stamping apparatus with a brace and an anvil which are advantageously configured as separate assemblies, wherein these can be combined with a beam welding apparatus for the second method step. This has the advantage of compact installation construction and short process times since it is not necessary for the workpiece to be removed after the first method step and supplied to another tool.

In that context, the use of a simple stamping process of the auxiliary joining part makes it possible to fall back on existing process technology, and therefore in this context no further development expenditure is necessary. Of particular advantage is also the use of simple element designs, which offer a potential for cost savings in comparison to the known solutions, in particular rotationally symmetric auxiliary joining part geometries, dispensing with an element head, no hardening of the elements and possibly also no element coating.

It is important that, when the auxiliary joining parts or auxiliary elements are introduced into the material of the component, the material is not completely pierced. This has the advantages of improving the corrosion resistance, the appearance and the surface flushness of the component. In the case of the already mentioned additional use of adhesive, it is possible to dispense with coating of the auxiliary joining parts since after welding these are completely surrounded by the component material and the adhesive, and therefore no corrosion-promoting medium can penetrate or come into contact.

During stamping, the auxiliary joining part is deformed by the setting tools of the stamping tools, whereby a length of the auxiliary joining parts for different joining part thicknesses can be used. In that context, the necessary upsetting of the joining part can be controlled via the stamping process.

Moreover, during stamping an appropriate stamping contour of the stamping tool end face can be used to generate an auxiliary joining part contour which projects from the component material and which is particularly advantageous for the second process step of welding. It is possible to generate connections between the components that are flush on both sides, which are advantageous for the indirect visible region of a vehicle body.

In that context, with the method according to the invention, it is particularly advantageous to connect a component made of a steel material (steel sheet) to another component made of a light metal, preferably aluminum, such that in this manner it is possible to produce mixed-construction structures.

When reading the claim language, the following definitions apply. When the claim language recites A and/or B it means A alone, B alone or A and B. When the claim language recites at least one of A and B it means A alone, B alone or A and B. When the claim language recites at least one of A or B it means A alone, B alone or A and B. When the claim language recites a form-locking connection, it is a connection that connects two elements together due to the shape of the elements themselves (e.g. ball and socket), as opposed to a force-locking connection, which locks the elements together by force external to the elements (e.g. screw).

Further advantages and advantageous embodiments are to be found in the following description of an exemplary embodiment, and in the patent claims and the figures.

There follows a more detailed explanation of an exemplary embodiment of the invention, with reference to the drawing.

Other features which are considered as characteristic for the invention are set forth in the appended claims.

Although the invention is illustrated and described herein as embodied in a method for connecting components made of different materials, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
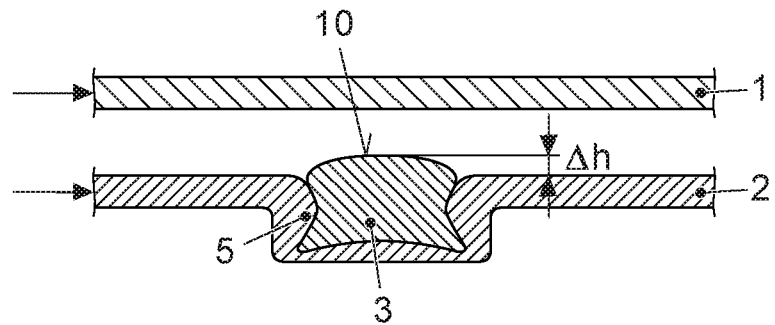
FIG. 1 is a diagrammatic, sectional view of components that are to be connected, with an auxiliary joining part already stamped into one of the components.

Referring now to the figures of the drawings in detail and first, particularly to FIG. 1 thereof, there is shown a component connection after a first process step. FIG. 1 shows a first component 1 made of a material having good weldability, preferably a steel sheet, which is to be connected to an opposing second component 2 in a second process step. In that context, the second component 2 is made of a material, preferably an aluminum material, which cannot be welded directly to the first component 1.

In a first process step which is known from the prior art and is not illustrated in greater detail, an auxiliary joining part 3 has been introduced into the second component 2 such that its free top face 10 facing the first component 1 projects with a height h from the surface of the second component 2, while its preferably cylindrical circumferential face forms an overhang 5 in the material of the second component 2. In that context, the auxiliary joining part 3 is preferably stamped into the second component 2 and is held there securely by a form fit and force fit. The cylindrical auxiliary joining part 3, which is known from the prior art and is not illustrated in greater detail in its original state, can in that context be plastically deformed during stamping (first method step) in order to achieve a better hold in the first component 1. In that context, the auxiliary joining part 3 consists of a material which has good weldability with the material of the first component 1, and preferably consists of the same material, a steel.

Figure 2:
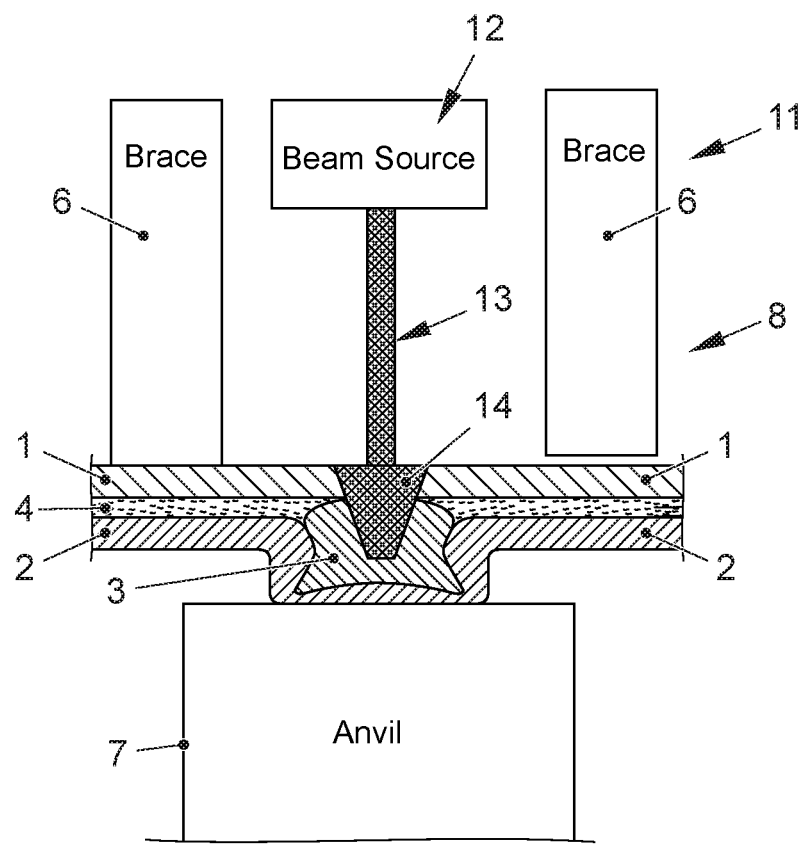
FIG. 2 is a schematic illustration of an apparatus according to the invention for carrying out the method.

The second method step according to the invention is illustrated in greater detail in FIG. 2.

FIG. 2 shows the first component 1 and the second component 2 clamped in a welding apparatus 11, wherein an intermediate layer 4 of an adhesive material is arranged between the first component 1 and the second component 2, the thickness of the intermediate layer 4 corresponding to the height h of the protrusion between the auxiliary joining part 3 and the second component 2. In that context, the welding apparatus 11 has a brace 6 that bears down on the first component 1 and clamps this and the entire component assembly against a separate anvil 7 that engages against the second component 2, preferably at the level of the pressed-in auxiliary joining part 3. Thus, the entire component assembly formed of the first component 1, the second component 2 and the auxiliary joining part 3 is securely clamped. The second method step of welding is now carried out by a beam source 12, preferably a laser which is combined with the brace 6 and the anvil 7 into a common apparatus. An energy beam 13 generated by the beam source 12, preferably a laser beam, now melts the first component 1, forming a weld nugget 14, and passes right through the first component 1. As welding continues, the energy beam or welding beam passes right through the first component 1 and into the auxiliary joining part 3 so as to form a materially-bonded welded connection between the first component 1 and the auxiliary joining part 3. In that context, the weld depth into the auxiliary joining part 3 is controlled such that the welding beam penetrates deep into the auxiliary joining part 3 but does not pass right through it and thus a closed end face on the second component 2 is retained.

In that context, it is alternatively possible to have multiple first components 1, one on top of the other, which can then be welded together with the auxiliary joining part 3 in the second component 2. For the beam welding method, it is possible to use, as an alternative to the described laser welding, other beam welding methods such as plasma welding or TIG welding methods.

Furthermore, it is also possible to carry out the first method step, namely the introduction and preferably the stamping of the auxiliary joining part 3 into the second component 2, in the apparatus 11 shown in FIG. 2. In this case, the welding apparatus 11 is simultaneously a stamping apparatus 8, the auxiliary joining part 3 then being stamped in using a tool (not shown) that then works against the anvil 7.

The following is a summary list of reference numerals and the corresponding structure used in the above description of the invention:

1 first component (steel material)
2 second component (aluminum)
3 auxiliary joining part
4 intermediate adhesive layer
5 overhang
6 brace
7 anvil
8 stamping apparatus
9 beam welding apparatus
10 top face of auxiliary joining part 3
11 welding apparatus
12 beam source (laser)
13 energy beam (laser welding beam)
14 weld nugget
h height of protrusion between component 2 and auxiliary joining part 3

The invention claimed is:

1. A method for connecting at least two components made of different materials by thermal joining, the two components including a first component made of a material that is suitable for thermal joining and a second component made of a material that cannot be joined directly to the material of the first component by thermal joining methods, which comprises the following method steps of:
   introducing an auxiliary joining part into the second component via at least one of a form-locking connection or a force-locking connection, wherein the auxiliary joining part being made of a material that can be thermally joined to the first component;
   thermally joining the first component to the auxiliary joining part in the second component so as to produce a connection between the first component and the second component, the connection being a weld nugget formed from a surface of the first component distal from the auxiliary joining part, through a body of the first component and into the auxiliary joining part, the thermally joining being carried out by a beam welding method utilizing an energy beam to form the weld nugget; and
   controlling the beam welding method using a weld depth control device to weld into the auxiliary joining part without the welding beam passing fully through the auxiliary joining part and into the second component.

2. The method according to claim 1, which further comprises selecting the beam welding method from the group consisting of a laser beam welding method, a plasma beam welding method and a tungsten inert gas welding method.

3. The method according to claim 1, which further comprising using a steel material for forming the first component and a not directly weldable material consisting of a light metal is used for the second component.

4. The method according to claim 1, which further comprises forming the auxiliary joining part from a same class of materials as the first component.

5. The method according to claim 1, which further comprises disposing an intermediate adhesive layer between the first component and the second component.

6. The method according to claim 1, which further comprises carrying out the method steps in a common apparatus and in a single clamping period.

7. The method according to claim 1, which further comprises stamping the auxiliary joining part into the second component, and plastically deforming the auxiliary joining part to form an overhang.

8. The method according to claim 1, which further comprises providing multiple layers of second components that are connected to one another by means of the auxiliary joining part.

9. The method according to claim 1, which further comprising using a steel material for forming the first component and a not directly weldable material consisting of aluminum is used for the second component.

* * * * *